United States Patent
Weber et al.

(10) Patent No.: US 9,289,927 B2
(45) Date of Patent: Mar. 22, 2016

(54) REINFORCEMENT OF CELLULAR MATERIALS

(75) Inventors: Hans-Jürgen Weber, Verden (DE); Markus Siemetzki, Buch am Erlbach (DE); Gregor Christian Endres, Schweinfurt (DE)

(73) Assignee: Airbus Operations GmbH (DE)

( * ) Notice: Subject to any disclaimer, the term of this patent is extended or adjusted under 35 U.S.C. 154(b) by 1346 days.

(21) Appl. No.: 11/921,037

(22) PCT Filed: May 18, 2006

(86) PCT No.: PCT/EP2006/004733
§ 371 (c)(1),
(2), (4) Date: Nov. 26, 2007

(87) PCT Pub. No.: WO2006/125561
PCT Pub. Date: Nov. 30, 2006

(65) Prior Publication Data
US 2009/0252917 A1    Oct. 8, 2009

Related U.S. Application Data

(60) Provisional application No. 60/685,296, filed on May 27, 2005.

(30) Foreign Application Priority Data

May 27, 2005 (DE) .......................... 10 2005 024 408

(51) Int. Cl.
*B29C 44/56* (2006.01)
*B29C 70/24* (2006.01)
(Continued)

(52) U.S. Cl.
CPC ............... *B29C 44/56* (2013.01); *B29C 70/086* (2013.01); *B29C 70/24* (2013.01); *B29L 2031/3076* (2013.01); *Y02T 50/433* (2013.01); *Y10T 428/24033* (2015.01)

(58) Field of Classification Search
CPC .............................. B29C 70/086; B29C 70/24
USPC ...................................................... 156/91–93
See application file for complete search history.

(56) References Cited

U.S. PATENT DOCUMENTS 2,692,219 A    10/1954    Slayet et al.
3,030,256 A *   4/1962    Rosenthal ...................... 428/85
(Continued)

FOREIGN PATENT DOCUMENTS

DE    1 951 310        4/1970
DE    9110061 U1       4/1992
(Continued)

OTHER PUBLICATIONS

Potluri et al., "Novel stitch-bonded sandwich composite structures", Composite Structures 59 (2003) 251-259.
(Continued)

*Primary Examiner* — Jeff Aftergut
(74) *Attorney, Agent, or Firm* — Lerner, David, Littenberg, Krumholz & Mentlik, LLP

(57) ABSTRACT

The invention pertains to a method for reinforcing cellular materials (1), a reinforced sandwich construction (5) as well as a correspondingly equipped aircraft. In the method, a cellular material (1) is provided with fiber bundles (3) that are introduced into the cellular material (1) with a needle (8). In this case, the needle (8) initially pierces a through-hole (2) into the cellular material (1) from one side in order to subsequently take hold of a fiber bundle (3) situated on the other side with the needle (8) and pull said fiber bundle into the cellular material (1).

25 Claims, 4 Drawing Sheets

(51) Int. Cl.
*B29C 70/08* (2006.01)
*B29L 31/30* (2006.01)

(56) References Cited

U.S. PATENT DOCUMENTS

| | | | |
|---|---|---|---|
| 3,207,107 A * | 9/1965 | Ferre | 112/170 |
| 3,240,176 A * | 3/1966 | Morrison | 112/475.18 |
| 3,328,218 A | 6/1967 | Noyes | |
| 4,196,251 A | 4/1980 | Windecker | |
| 4,206,895 A | 6/1980 | Olez | |
| 4,380,253 A | 4/1983 | Mead et al. | |
| 4,426,414 A | 1/1984 | Wilkerson | |
| 4,506,611 A * | 3/1985 | Parker et al. | 112/80.01 |
| 4,622,908 A | 11/1986 | Tranberg | |
| 4,854,250 A | 8/1989 | Stuvecke et al. | |
| 5,308,228 A | 5/1994 | Benoit et al. | |
| 5,580,412 A | 12/1996 | Fantino | |
| 5,624,622 A | 4/1997 | Boyce et al. | |
| 5,733,404 A * | 3/1998 | Freitas et al. | 156/285 |
| 5,741,574 A | 4/1998 | Boyce et al. | |
| 5,833,802 A * | 11/1998 | Yasui et al. | 156/510 |
| 5,834,082 A | 11/1998 | Day | |
| 5,919,413 A * | 7/1999 | Avila | B29C 66/8122 156/303.1 |
| 5,935,680 A | 8/1999 | Childress | |
| 6,027,798 A * | 2/2000 | Childress | 428/319.3 |
| 6,187,411 B1 * | 2/2001 | Palmer | 428/102 |
| 6,740,381 B2 | 5/2004 | Day et al. | |
| 7,105,071 B2 * | 9/2006 | Johnson et al. | 156/92 |
| 7,652,075 B2 | 1/2010 | Lang et al. | |
| 2002/0007897 A1* | 1/2002 | Farley | 156/163 |
| 2002/0153084 A1 | 10/2002 | Johnson et al. | |
| 2004/0258388 A1 | 12/2004 | Kim et al. | |
| 2005/0025948 A1* | 2/2005 | Johnson et al. | 428/223 |
| 2009/0229761 A1 | 9/2009 | Joern et al. | |

FOREIGN PATENT DOCUMENTS

| | | | |
|---|---|---|---|
| DE | 697 06 829 | T2 | 11/1998 |
| DE | 10018035 | A1 | 10/2001 |
| DE | 102005024408 | A1 | 11/2006 |
| DE | 102005034400 | A1 | 2/2007 |
| EP | 0 902 135 | A1 | 3/1999 |
| EP | 1 348 790 | A1 | 10/2003 |
| FR | 2718670 | A1 | 10/1995 |
| GB | 2 245 862 | A | 1/1992 |
| GB | 2245862 | A * | 1/1992 |
| JP | 63-092769 | | 4/1988 |
| JP | 01-129294 | | 9/1989 |
| JP | 272031 | A * | 10/1993 |
| JP | 05-508362 | T | 11/1993 |
| JP | 06-270310 | A | 9/1994 |
| JP | 08-033406 | | 2/1996 |
| JP | 2001-7625 | A | 1/2001 |
| JP | 2001-246686 | A | 9/2001 |
| JP | 2003019763 | A | 1/2003 |
| JP | 2007-502231 | T | 2/2007 |
| RU | 2093362 | C1 | 10/1997 |
| WO | 92/00845 | A1 | 1/1992 |
| WO | WO-97/28399 | A1 | 8/1997 |
| WO | 2006125561 | A1 | 11/2006 |

OTHER PUBLICATIONS

Potluri et al., "Structural performance of orthogonal and bias stitched sandwich structures with rigit close-cellular foams", 44th AIAA/ASME/ASCE/AHS Structures, Structural Dynamics, and Materials Confere, Apr. 7-10, 2003, Norfolk, Virginia, pp. 1-7.

Stanley et al., "Development and evaluation of stitched sandwich panels", NASA/CR-2001-211025, , Jun. 2001, 166 pages.

Japanese Office Action for Application No. 2008-512738 dated Dec. 13, 2011.

Taiwanese Office Action for Application No. 097145248 dated Apr. 22, 2014.

* cited by examiner

REINFORCEMENT OF CELLULAR MATERIALS

REFERENCE TO RELATED APPLICATIONS

This application claims the benefit of the filing date of German Patent Application No. 10 2005 024 408.4 filed May 27, 2005 and of U.S. Provisional Patent Application No. 60/685,296 filed May 27, 2005, the disclosure of which applications is hereby incorporated herein by reference.

FIELD OF THE INVENTION

The present invention relates to the technical field of composite materials. The invention specifically relates to a method for manufacturing a reinforced cellular material. The invention also relates to a sandwich-type component with a core of reinforced cellular material, as well as to an aircraft with such a sandwich-type component or with a structural component that was manufactured by utilizing the method according to the invention.

TECHNOLOGICAL BACKGROUND

Due to their superior rigidity or strength to density ratio, composite materials and, in particular, sandwich constructions are broadly utilized in the field of aircraft construction. Sandwich-type components usually consist of an upper and a lower cover layer or surface, between which a honeycomb-like core structure is arranged that is composed of vertically extending cells with hexagonal cross section and serves for increasing the rigidity.

The sandwich construction may also have other properties, for example, acoustic or thermal insulation properties (so-called multifunctional properties) if the sandwich structure is realized accordingly. This may make it possible to eliminate additional measures realized with separate components such that a weight reduction of the overall concept is achieved.

Rigid cellular materials are used as an alternative to a design with a honeycomb structure. In comparison with honeycomb structures, rigid cellular materials provide certain advantages with respect to thermal and acoustic insulation, as well as the component manufacture. However, one disadvantage of such foam-based sandwich constructions can be seen in the expected inferior mechanical properties in comparison with sandwich constructions that have a honeycomb-like core structure of comparable density. This is compensated my utilizing sewing techniques for incorporating fibers or threads into components of rigid cellular materials. After a resin infiltration process, the regions penetrated by the fibers contribute to the mechanical reinforcement of the cellular material.

A known sandwich construction reinforced with stitches is described, for example, in U.S. Pat. No. 6,187,411. In order to reinforce this sandwich construction, it is sewn up with a thread in a two-sided sewing process, in which an upper thread is inserted into the laminate with a needle from one cover layer of the sandwich construction by means of conventional techniques and held by a lower thread in the laminate in the vicinity of the other cover layer. This creates a loop when the needle is retracted from the laminate. A two-sided sewing technique of this type is also described in U.S. Pat. No. 4,196,251, wherein the lower thread extends parallel to the second cover layer and essentially perpendicular to the upper thread. U.S. Pat. No. 5,624,622 also describes a sandwich construction of cellular materials that is reinforced by means of a sewing process, wherein known chain-stitch or back-stitch sewing techniques are utilized.

In all known sewing methods, a needle initially penetrates the cellular material and simultaneously introduces the thread into the cellular material. During the piercing of the cellular material, the thread essentially extends parallel to the needle over the entire length. The hole size of the piercing hole therefore is defined by the needle diameter and the thickness of the thread.

Consequently, one disadvantage of all these known methods is that the hole remaining after the retraction of the needle from the cellular material is excessively large in relation to the thickness of the introduced thread. This leads to the region of the hole that is not filled out by fibers to be filled with resin after the resin infiltration such that the improvement of the mechanical properties is not realized with the fibers as desired, but rather essentially based on the infiltrated resin in these methods. However, the improvements of the specific mechanical properties, i.e., weight-related properties, are not sufficient for the lightweight construction potential required in aircraft construction such that the utilization of reinforced cellular materials of this type is only considered in rare instances.

SUMMARY OF THE INVENTION

Amongst other things, it may be an objective of the present invention to improve the reinforcement of cellular materials with fibers or fiber bundles in such a way that, in essence, the introduced fibers are responsible for the improvement of the mechanical properties of the cellular material core.

The term cellular material used in the context of the present invention refers to any core material that is suitable for use as a core material in sandwich constructions. The cellular materials preferably consist of actual cellular materials, but may in the context of the present invention also consist of textiles such as, for example, felts or any other non-woven fabric. For example, the described method just as well allows the unproblematic utilization of textile semi-finished products, particularly felts or non-woven fabrics, in order to improve their properties in another dimension. In the context of the present invention, the term fiber bundles refers to rovings consisting of a plurality of individual fibers or monofilaments, individual fibers as well as threads that are produced by twisting individual fibers or fiber bundles. The term thickness of a fiber bundle refers to the sum of all individual fibers in compressed form in the context of the present invention.

The objective of the invention may be attained with a method for manufacturing a three-dimensionally reinforced cellular material, with a correspondingly manufactured sandwich-type component, as well as with an application, for example, in the field of aeronautics and astronautics and, in particular, with an aircraft that is equipped with such a sandwich-type component or features a structural component that was manufactured by utilizing the method according to the invention.

The invention is based on the notion of eliminating the simultaneous introduction of the fiber bundles for reinforcing a cellular material during the production of the holes, inside of which the fibers bundles should ultimately be arranged in a directed fashion, and to initially provide the cellular material with a through-hole that extends from a first surface in the direction of a second surface in order to subsequently pull a fiber bundle made available on the other side of the second surface into the through-hole in the direction of the first surface. In the method according to the invention, a through-hole is therefore initially produced in a cellular material in a first step, wherein said through-hole extends from a first surface of the cellular material to a second surface of the cellular material. The cellular materials in question may have three-dimensional geometries with opposing surfaces, wherein parallel surfaces are only present in simple instances. Sandwich constructions frequently feature three-dimensional curvatures, abrupt changes in thickness and the like.

At least one fiber bundle is made available on the other side of the second surface of the cellular material before, during or after the production of the through-hole. The term on the other side of the second surface refers to the fiber bundle being situated closer to the second surface than to the first surface. After producing the through-hole in the cellular material, the at least one fiber bundle can be taken hold of from the direction of the through-hole in order to be subsequently pulled into the through-hole in the cellular material. In other words, an element reaches through the through-hole from the first surface of the cellular material in order to pick up or take hold of and pull the fiber bundle situated on the other side through the through-hole in the direction of the first surface. This reaching-through may take place simultaneously with the production of the through-hole that is realized, for example, by piercing the cellular material with a needle or in a subsequent step.

As mentioned above, the cellular materials may consist of any arbitrary cellular materials, but high-quality PMI rigid cellular materials may be advantageous in the field of aeronautics. Naturally, it is also possible to utilize other cellular materials that consists, for example, of polyvinyl chloride or polyurethane. Instead of utilizing the method according to the invention for reinforcing cellular materials, the inventive method may also be used for reinforcing textiles such as, for example, felts or any other non-woven fabrics that, in the context of the invention, can also be subsumed under the generic term cellular materials.

The through-holes can be produced in the cellular material in any angular position. The orientation of the through-holes can be individually adapted, in particular, to the respective shape of the cellular material to be reinforced as well as to the load situations to be expected under operating conditions. The method makes it possible to custom-tailor a sandwich structure to a specific load and application.

As mentioned above, the at least one fiber bundle is made available on the other side of the second surface of the cellular material. In order to easily take hold of the fiber bundle, it may be held in the region of the through-hole, for example, in a straight, stretched-out fashion in the vicinity of the second surface in order to reliably take hold of the fiber bundles with a hook or the like. When taking hold of such a straight, stretched-out fiber bundle in order to pull the fiber bundle through the through-hole, it is initially doubled such that a loop is formed. Due to this measure, the number of (mono) filaments that ultimately extend through the through-hole is twice as high as the number of the individual fibers of the fiber bundle in the initial state. Alternatively, it would be possible to already produce a loop to be taken hold of or grabbed such that the folding process is eliminated. The fiber materials used may consist, for example, of aramide fibers, carbon fibers, nylon fibers, polyester fibers, metal fibers or glass fibers, wherein any other fiber materials can also be utilized. The fiber bundles frequently consist of 12K rovings, i.e., fiber bundles with 12,000 monofilaments. In order to additionally improve the reinforcing effect achieved with the rovings, it would naturally also be possible to utilize rovings with more or less than 12,000 fibers, for example, 24K rovings (24,000 individual fibers) or rovings with even more fibers.

The method according to the invention may make it possible to improve the specific mechanical properties of cellular materials used in a variety of fields. Reinforced cellular materials of this type are primarily used for applications, in which it is important to fulfill strict rigidity requirements with low material costs and little weight. The field of aeronautics and astronautics is one classic example of a field in which such reinforced cellular materials are used, namely because the requirements with respect to the rigidity or strength of the structural components and the least weight possible always apply in this case. In aeronautical and astronautical engineering, for example, the method according to the invention may make it possible to manufacture flaps, rudders or fuselage structures as well as paneling parts or parts of the interior by utilizing the method according to the invention. In addition, the inventive method can also be utilized in the automobile, construction or furniture industry as well as any other branches of industry, in which the materials used frequently must fulfill strict rigidity requirements and the weight needs to be simultaneously minimized. The method according to the invention can also be used in all instances, in which not only the aforementioned rigidity properties, but also thermal and/or acoustic insulation properties are of importance because these are inherent properties of the materials used in the method due to their ability to be easily compressed.

The through-hole in the cellular material can be produced by piercing the cellular material with a needle from the first surface until the needle emerges through the second surface of the material. The needle should have the smallest shaft diameter possible so as to avoid producing a through-hole with an excessively large cross section. The cross-sectional surface of the needle shaft should, in particular, not exceed the thickness of the fiber bundle to be pulled through the through-hole (or not be larger than twice the single thickness of the fiber bundle in the stretched-out initial state, respectively).

In order to pick up the at least one fiber bundle, it may be hooked, for example, in the needle. For this purpose, the needle may feature a point with an eyelet that is provided with an opening on one side such that the fiber bundle can be inserted into the eyelet in the region of the needle point through this lateral opening.

If the through-hole is produced with a needle, the shaft of which has the smallest cross-sectional surface possible, it can be ensured that the produced through-hole has a cross-sectional surface that is smaller than the thickness of the fiber bundle pulled therethrough. This defined size of the cross-sectional surface of the through-hole may make it possible to compress the fiber bundle while it is pulled into the through-hole such that the individual fibers adjoin one another as tightly as possible and extend through the through-hole as parallel as possible to the inner wall thereof. In order to simplify the pulling-in and the compressing of the individual fibers, a funnel-shaped nozzle may be arranged at the location, at which the respective fiber bundle is pulled into the cellular material, wherein the fiber bundle is pulled into the cellular material and additionally compressed by this funnel-shaped nozzle. However, since the individual fibers typically have a round cross section, sufficient space for subsequently introducing a matrix system—particularly of duroplastic nature—into the through-opening and between the individual fibers also remains between the individual fibers in the thusly compressed state of the fiber bundle.

The preceding explanations make it clear that the taking-hold of the fiber bundle on the other side of the second surface, for example, by means of a needle prevents the through-hole being produced from undesirably becoming larger when the needle is retracted. Since the needle ultimately penetrates into the through-hole again with its tip during the retraction, the needle is inserted into the cellular material through the through-hole such that it is followed by the at least one fiber bundle. The fiber bundle therefore does not extend parallel to the shaft of the needle when it is pulled into the through-hole, but rather follows the same and merely overlaps the needle in the region of the point, in which the needle has its minimum thickness and only contributes slightly to the thickness of the fiber bundle.

After the at least one fiber bundle is pulled through the through-hole in the above-described fashion, it can be cut off flush with the first and/or the second surface. Alternatively, the ends of the fiber bundle that protrude over the surfaces could also be flatly placed against the surfaces and bonded thereto. If the cellular material to be reinforced consists of a sandwich construction, the first and/or the second surface can be formed by a cover surface or a cover layer of the sandwich structure. In this case the previously produced through-hole extends through the cellular material as well as the two cover layers that cover the cellular material such that the fiber bundle also extends through these three layers. Naturally, it would also be possible to introduce fiber bundles into a bare cellular material in the above-described fashion and to subsequently provide both sides with corresponding cover layers, wherein the protruding ends of the fiber bundles are placed and bonded or laminated between the cover layer and the cellular material.

In order to ultimately produce the bond between the individual fibers as well as between the fibers and the cellular material, the through-hole containing the at least one fiber bundle can be infiltrated with a resin in an ensuing step. The infiltration may be realized, for example, by applying a vacuum to one side of the cellular material in order to draw a resin situated on the other side through the through-hole. Alternatively, any other known infiltration method may be employed.

In order to reinforce a cellular material with fiber bundles by means of the described method, it is necessary to carry out the method several times so as to introduce fiber bundles into the cellular material at various locations. Therefore, the method begins anew at another location after the at least one fiber bundle was pulled into the cellular material through the through-hole. Instead of merely producing one hole at one location of the cellular material with this method in order to subsequently pull through a fiber bundle, the method may also be carried out simultaneously at various locations. For example, the cellular material could be simultaneously pierced by a plurality of needles and a corresponding number of fiber bundles could be made available on the other side of the cellular material such that they can be taken hold of or grabbed by the needles and pulled into the cellular material through the through-holes produced by the needles. It is also possible to produce a fiber bundle that connects several holes if the process of making available the fiber bundles is configured in a suitable fashion.

According to another aspect of the present invention, the objective thereof is attained with a sandwich-type component according to the invention. The inventive sandwich-type component comprises a core of cellular material with opposing first and second surfaces. The core of cellular material contains a plurality of through-holes that extend between the first and the second surface. In this case, a fiber bundle is pulled through each of these through-holes, wherein the through-holes have a cross-sectional surface that essentially is completely filled out by the fiber bundles and provided with a matrix. The individual fibers of the fiber bundle extend through the respective through-holes in a straight fashion in this case.

The sandwich-type component according to the invention has a good strength or rigidity and a low weight. This optimized ratio between rigidity and weight is based on the fact that the through-holes essentially are completely filled out by the fiber bundles such that the resin content in the through-holes can be maintained at a low level.

Due to the rigidity properties of the sandwich-type component according to the invention, it can be used for all applications in which it is important to achieve good rigidities while simultaneously maintaining the weight as low as possible. One important application for the inventive sandwich-type component therefore is the field of aeronautics and astronautics because the weight minimization naturally always needs to be observed in this case. In the field of aeronautics and astronautics, it is possible to manufacture, for example, flaps, rudders or fuselage structures as well as paneling parts or parts of the interior in the form of the sandwich-type component according to the invention. Other fields of applications are, for example, the automobile industry, the construction industry or the furniture industry as well as any other branches of industry, in which an optimized ratio between rigidity and weight is frequently of importance.

The sandwich-type components according to the invention primarily consist of flat components with two opposing surfaces, wherein the surfaces lie parallel to one another in simple instances. However, sandwich constructions frequently feature three-dimensional curvatures, abrupt changes in thickness and the like.

Although the core of cellular material may consist of any arbitrary cellular material, high-quality PMI rigid cellular materials may be advantageous in the field of aeronautics. However, it would also be possible to utilize other cellular materials that consist, for example, of polyvinyl chloride or polyurethane. Textiles such as, for example, felts or any other non-woven fabrics can also be subsumed under the generic term cellular materials.

In order to prevent the through-holes produced in the cellular material from being predominantly filled with resin such that the weight of the sandwich-type component would be undesirably increased and the rigidity properties would be diminished, the through-holes have a cross-sectional surface that is smaller than the thickness of the fiber bundle being pulled therethrough such that the fiber bundle is compressed while it is pulled through and the through-hole possibly is slightly widened. This not only makes it possible to maintain a low density of the sandwich-type component, but also to ensure that the individual fibers of the fiber bundle essentially extend through the through-hole in a straight fashion because the individual fibers are pulled straight during this compression process.

Since the sandwich-type components typically consist of at least three layers (a core and two cover layers), the plurality of through-holes may directly extend from one cover layer to the other cover layer, i.e., the first and/or the second surface of the sandwich-type component is/are formed by a cover layer. The fiber bundles consequently may extend through the entire sandwich-type component including the cover layers.

Depending on the manufacturing and operating conditions, the fiber bundles may either end flush with the first and/or the second surface or be flatly placed against the first and/or the second surface. If the surfaces respectively consists of a cover layer, the fiber bundles therefore either end flush with a cover layer or are flatly placed against their upper side. Naturally, it is also possible for the fiber bundles to directly end flush with the core of cellular material or to be flatly placed against said core, to both sides of which corresponding cover layers may be laminated.

The preceding explanations regarding the sandwich-type component according to the invention make it clear that this component can be manufactured by utilizing the inventive method for manufacturing a reinforced cellular material as explicitly described above. Therefore, the explanations regarding the inventive method analogously apply to the sandwich-type component.

SHORT DESCRIPTION OF THE DRAWINGS

The invention will be described below considering an exemplary embodiment with reference to the enclosed figures, wherein FIG. 1 shows an initial state of the method according to the invention;

Identical or similar components are identified by the same reference characters in all figures. The illustrations in the figures elucidate the method as well as the inventive sandwich-type component in a purely schematic fashion and may partially not be true-to-scale.

DETAILED DESCRIPTION OF AN EXEMPLARY EMBODIMENT

Figure 1:
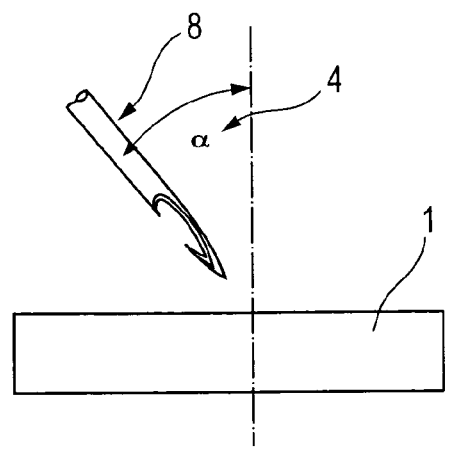

FIG. 1 shows a barbed needle 8 before the piercing of a cellular material 1. One peculiarity of the barbed needle 8 is that it features an eyelet region on its tip that is open on one side as described in greater detail below with reference to FIGS. 7a-7c. The cellular material 1 consists, for example, of a PMI rigid cellular material or a cellular material of lower quality, for example, a cellular PVC material or a cellular polyurethane material. The cellular material 1 may also consist of a textile material such as, for example, a felt or any other non-woven fabric. According to FIG. 1, the needle 8 is aligned relative to the vertical line by an angle $\alpha$. The angle $\alpha$ can be varied between 0 and 90° in order to introduce a fiber bundle into the cellular material 1 at an arbitrary angle $\alpha$. This may make it possible to achieve a "custom-tailored" reinforcement so as to take especially into account certain load situations, to which the cellular material 1 will be subjected in the sandwich construction. Although the angle $\alpha$ is merely illustrated two-dimensionally due to the two-dimensional figure, this angle $\alpha$ naturally may also be a solid angle such that the through-hole and the fiber bundle subsequently situated therein can be arranged in the cellular material 1 at an arbitrary solid angle.

Figure 2:
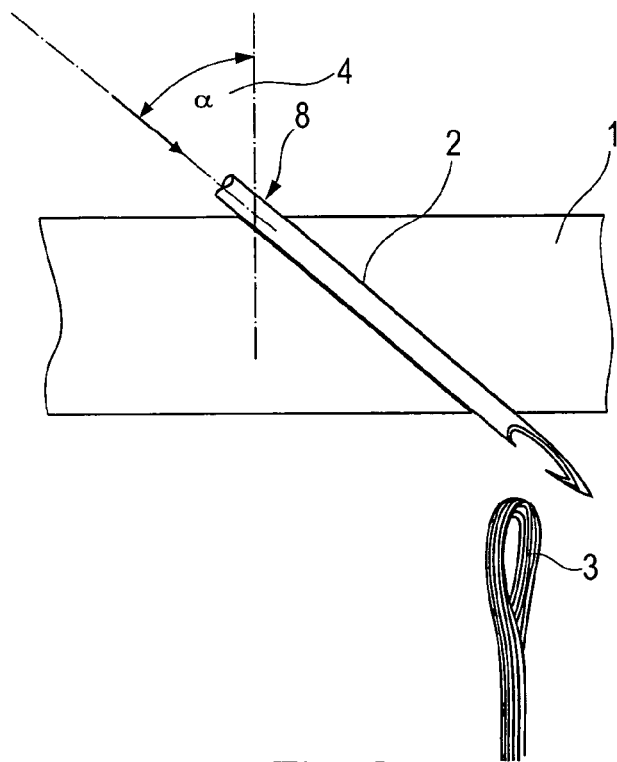
FIG. 2 shows several steps of the method in an exemplary fashion.

FIG. 2 shows a stage of the manufacturing method, in which the needle 8 has just penetrated the cellular material 1 with its point. Due to this penetration, a through-hole 2 was produced in the cellular material 1 that extends through the cellular material 1 at a solid angle $\alpha$. A fiber bundle 3 (for example, a 24K roving) that was shaped into a loop in the immediate vicinity of the underside of the cellular material 1 is situated underneath the cellular material 1 in the region of the exit point of the needle 8. This loop of the fiber bundle 3 therefore can be taken hold of or grasped by the barbed needle 8 in order to pull the fiber bundle 3 into the cellular material 1 when the needle 8 is retracted.

Although the fiber bundle 3 is illustrated in the form of a loop in FIG. 2 for reasons of clearness, the fiber bundle 3 may actually be arranged underneath the cellular material 1 and stretched straight parallel thereto in order to take hold of this stretched fiber bundle 3 underneath the cellular material 1 with the aid of the needle 8. The fiber bundle 3 has a single thickness S such that the looped fiber bundle section according to FIG. 2 approximately has a double thickness 2S.

Figure 3:
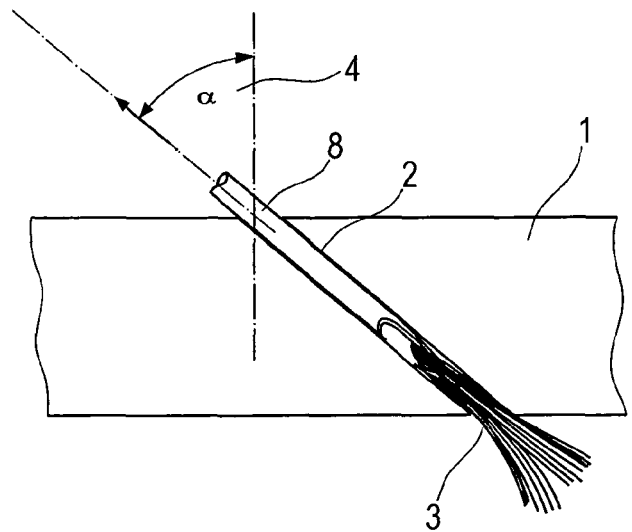
FIG. 3 shows another step of the method in an exemplary fashion.

In FIG. 3, the needle 8 is already retracted again from the cellular material 1. Due to this retraction, the fiber bundle 3 taken hold of or grabbed by the needle 8 is pulled into the through-hole 2 on the underside of the cellular material 1, wherein the fiber bundle 3 is compressed when it penetrates into the through-hole. This compression occurs because the needle 8 and therefore the through-hole 2 have a cross-sectional surface that is smaller than the double thickness 2S of the fiber bundle being pulled through. The individual fibers of the fiber bundle 3 are essentially aligned straight and tightly pressed against one another in the through-opening 2 due to this compression and the tensile force exerted upon the fiber bundle by the needle 8 such that only very fine intermediate spaces remain between the individual fibers.

Figure 4:
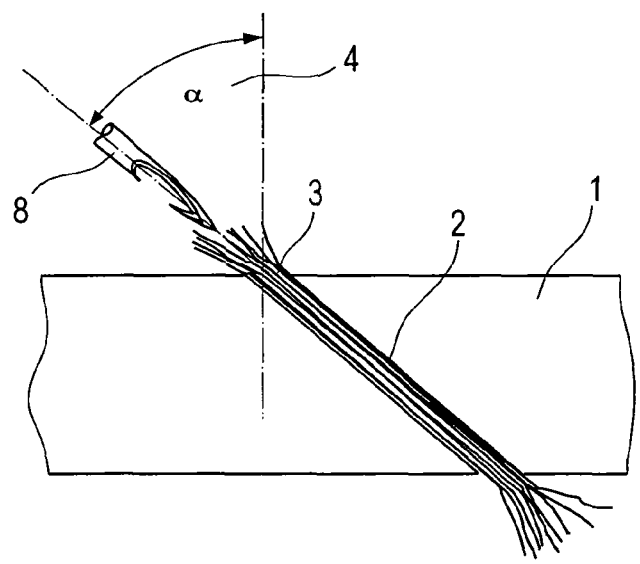
FIG. 4 shows a cellular material with an introduced fiber bundle.

In FIG. 4, the entire fiber bundle 3 is pulled into the cellular material 1 at the angle $\alpha$, wherein the needle 8 was already decoupled from the fiber bundle 3. For example, the fiber bundle 3 can now be cut off flush with both sides of the cellular material 1 in order to subsequently infiltrate the through-hole 2 with a resin.

Figure 5:
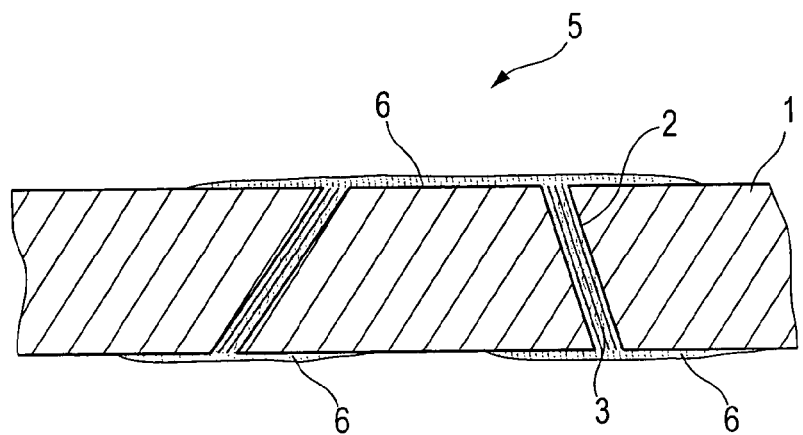
FIG. 5 shows a first reinforced sandwich-type component.

Alternatively, the ends of the fiber bundle 3 shown in FIG. 4 can be placed against both surfaces of the cellular material 1 and bonded thereto. The bonding can be realized, for example, by laminating cover layers 7 that, however, are not illustrated in FIG. 5 to both surfaces of the cellular material such that the ends of the fiber bundles 3 tightly adjoin and are bonded to the surfaces of the cellular material 1.

Figure 6:
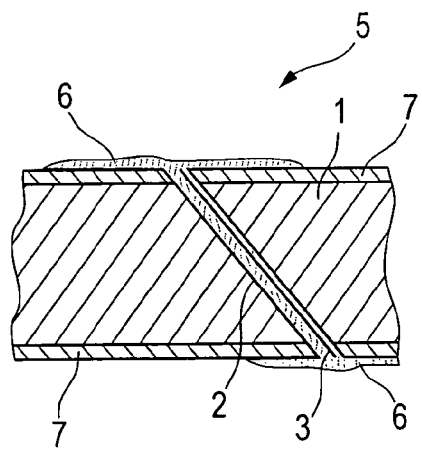
FIG. 6 shows a second reinforced sandwich-type component.

Instead of merely producing one through-hole 2 in the core of the sandwich-type component in the above-described fashion in order to pull through a fiber bundle 3, it is also possible to additionally penetrate the cover layers 7 with the needle 8 as shown in FIG. 6 in order to subsequently pull a fiber bundle 3 through the entire sandwich-type component 5, wherein the ends of said fiber bundle may once again be flatly placed against and bonded to the cover layers 7 or cut off flush with the cover layers 7 as shown in FIG. 6.

Figure 7C:
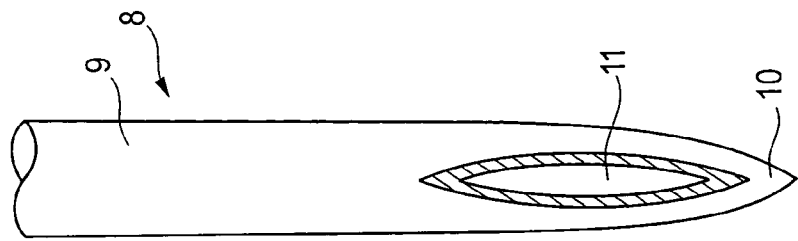
FIGS. 7a-7c show three differently designed needles for carrying out the inventive method.
Figure 7B:
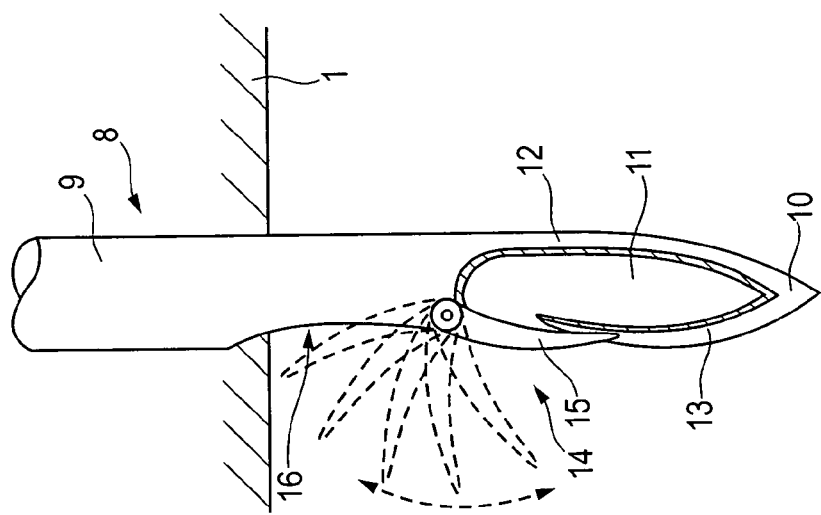
Figure 7A:
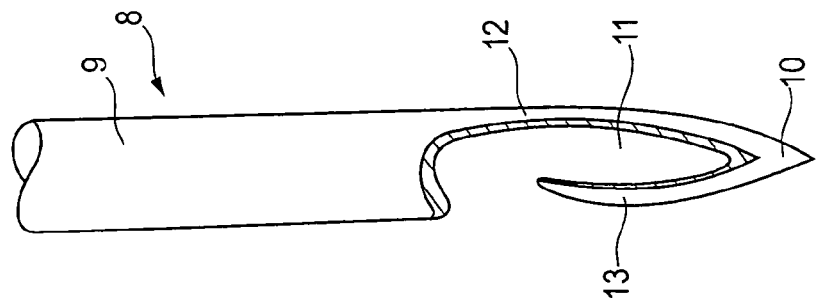

FIGS. 7a-7c show three differently designed needles for carrying out the method according to the invention. FIG. 7a shows a first embodiment of a barbed needle 8 with a straight shaft 9 that this tapered to a point 10 on its front side. In the region of the point 10, the needle 8 features an eyelet 11 that, however, is provided with an opening on one side in order to the thusly introduce a fiber bundle 3 into the eyelet region 11 of the needle 8. The eyelet region 11 of the barbed needle 8 therefore consists of a first limb 12 that continuously extends to the point 10 and a second limb 13 that extends back in the direction of the shaft 9, however, without reaching said shaft from the point 10 (in a convexly curved fashion).

The barbed needle 8 shown in FIG. 7b essentially corresponds to that shown in FIG. 7a, but also features an additional closing mechanism 14 that is designed for closing the opening of the eyelet 11 while the needle is retracted from the cellular material 1. The closing mechanism 14 essentially consists of a flap 15 that adjoins the shaft of the needle 8 in a tapered region 16 in its initial position. As soon as this flap 15 contacts the cellular material 1 with its free end when the needle 8 is retracted from the cellular material, the flap moves in the counterclockwise direction from its initial position, namely into a position in which it completely closes the opening of the eyelet 11 as shown in FIG. 7b. This prevents the hook end of the second limb 13 from damaging the inner wall of a through-hole 2 in the cellular material 1 when the needle 8 is retracted from the cellular material 1. In addition, the closing mechanism 14 ensures that no fibers are separated from the fiber bundle 3 while it is pulled into the cellular material 1. When piercing the cellular material 1 including already applied cover layers 7 or a textile semi-finished product, the closing mechanism 14 prevents the needle 8 from taking hold of and pulling into the interior of the hole fibers of the textile material. Such an effect is actually desirable, for example, in the needling of felts, but could lead to a loss of the mechanical properties of the subsequent composite in these applications.

FIG. 7c shows a third embodiment of a needle 8 that features a lenticular eyelet 11 in region of its point 10. Instead of being able to take hold of a fiber bundle 3 through the opening in the eyelet as in the two above-described needles, a fiber bundle 3 needs to be inserted or shot through the eyelet 11 of the needle according to FIG. 7c in order to produce the connection with the needle.

REFERENCE LIST

1 Cellular material
2 Through-hole
3 Fiber bundle/roving
4 Piercing angle α
5 Sandwich-type component
6 Flatly adjoining fiber end
7 Cover layer
8 Needle
9 Shaft
10 Point
11 Eyelet
12 First limb
13 Second limb
14 Closing mechanism
15 Flap
16 Tapered shaft region
S Single thickness of a fiber bundle

What is claimed is:

1. A method for manufacturing a reinforced cellular material, the method comprising:
    variably aligning a needle relative to a perpendicular axis of the cellular material by an arbitrary angle between 0 and 90 degrees;
    producing a through-hole in the cellular material comprising foam material, by piercing the cellular material with the needle, wherein the through-hole extends from a first surface of the cellular material to a second surface of the cellular material;
    making available at least one fiber bundle on the other side of the second surface of the cellular material;
    reaching through the through-hole from the first surface to take hold of the at least one fiber bundle with the needle; and
    pulling the at least one fiber bundle with the needle into the through-hole in the cellular material;
    wherein the pulling step comprises pulling the at least one fiber bundle through a funnel-shaped nozzle prior to pulling the at least one fiber bundle through the cellular material,
    wherein the through-hole is produced with a cross-sectional surface such that the at least one fiber bundle is compressed while being pulled through; and
    wherein an orientation of the through-hole is configured to be individually adapted by varying the alignment of the needle such that the at least one fiber bundle is pulled into the cellular material with the needle at the arbitrary angle.

2. The method of claim 1,
    wherein the needle is essentially inserted into the through-hole in the cellular material such that the needle is followed by the at least one fiber bundle.

3. The method of claim 1, further comprising:
    shearing off the at least one fiber bundle pulled into the through-hole such that the at least one fiber bundle ends flush with at least one of the first and second surfaces; or
    placing the at least one fiber bundle pulled into the through-hole against at least one of the first and second surfaces.

4. The method of claim 1, further comprising:
    forming or arranging a cover layer on at least one of the first and second surfaces.

5. The method of claim 1, further comprising:
    filling the through-hole containing the at least one fiber bundle with a matrix system.

6. The method of claim 1,
    wherein the method begins anew after the at least one fiber bundle was pulled into the through-hole in the cellular material.

7. The method of claim 1,
    wherein the reaching through the through-hole is simultaneously performed with the producing of the through-hole.

8. The method of claim 1,
    wherein the at least one fiber bundle is taken hold of by being hooked in the needle.

9. The method of claim 8,
    wherein an inner wall of the through-hole is prevented from being damaged by the needle with a closing mechanism configured for closing an eyelet.

10. The method of claim 1,
    wherein the through-hole is produced with a cross-sectional surface smaller than double the thickness of the fiber bundle to be pulled therethrough such that the fiber bundle is compressed while being pulled through.

11. The method of claim 1,
    wherein the reaching-through is simultaneously performed with the producing of the through-hole.

12. The method of claim 1, wherein the cellular material comprises a cover layer,
    wherein the through-hole is formed in the cover layer by the needle, and
    wherein, after pulling the at least one fiber bundle with the needle into the through-hole in the cellular material, ends of the at least one fiber bundle are either (i) placed flatly against, and bonded to, the cover layer, or (ii) cut off flush with the cover layer.

13. The method of claim 1, wherein the at least one fiber bundle is made available in a straight, stretched-out fashion in the vicinity of the second surface.

14. The method of claim 1, wherein the producing the through-hole in the cellular material comprises simultaneously piercing the cellular material with a plurality of needles, and wherein making at least one fiber bundle available comprises making a corresponding number of fiber bundle available.

15. A method for manufacturing a reinforced cellular material, the method comprising:
   variably aligning a needle relative to a perpendicular axis of the cellular material by an arbitrary angle which is between 0 and 90 degrees;
   producing a through-hole in the cellular material, which comprises foam material, by piercing the cellular material with the needle, wherein the through-hole extends from a first surface of the cellular material to a second surface of the cellular material;
   making available at least one fiber bundle on the other side of the second surface of the cellular material;
   reaching through the through-hole from the first surface to take hold of the at least one fiber bundle with the needle; and
   pulling the at least one fiber bundle with the needle into the through-hole in the cellular material such that the needle is followed by the at least one fiber bundle;
   wherein the pulling step comprises pulling the at least one fiber bundle through a funnel-shaped nozzle prior to pulling the at least one fiber bundle through the cellular material,
   wherein the through-hole is produced with a cross-sectional surface such that the at least one fiber bundle is compressed while being pulled through; and
   wherein an orientation of the through-hole is configured to be individually adapted by varying the alignment of the needle such that the at least one fiber bundle is pulled into the cellular material with the needle at the arbitrary angle.

16. A method for manufacturing a reinforced cellular material, the method comprising:
   variably aligning a needle relative to a perpendicular axis of the cellular material by an arbitrary angle which is between 0 and 90 degrees;
   producing a through-hole in the cellular material, which comprises foam material, by piercing the cellular material with the needle, wherein the through-hole extends from a first surface of the cellular material to a second surface of the cellular material;
   making available at least one fiber bundle on the other side of the second surface of the cellular material;
   reaching through the through-hole from the first surface to take hold of the at least one fiber bundle with the needle; and
   pulling the at least one fiber bundle with the needle into the through-hole in the cellular material;
   wherein the pulling step comprises pulling the at least one fiber bundle through a funnel-shaped nozzle prior to pulling the at least one fiber bundle through the cellular material,
   wherein the individual fibers of the at least one fiber bundle are essentially aligned straight and tightly pressed against one another in the through-hole; and
   wherein an orientation of the through-hole is configured to be individually adapted by varying the alignment of the needle such that the at least one fiber bundle is pulled into the cellular material with the needle at the arbitrary angle.

17. A method for manufacturing a reinforced cellular material, the method comprising:
   producing a through-hole in the cellular material that extends from a first surface of the cellular material to a second surface of the cellular material;
   making available at least one fiber bundle on the other side of the second surface of the cellular material;
   reaching through the through-hole from the first surface to take hold of the at least one fiber bundle;
   pulling the at least one fiber bundle into the through-hole in the cellular material; and
   pulling the at least one fiber bundle through a funnel-shaped nozzle prior to pulling the at least one fiber bundle through the cellular material.

18. The method of claim 17,
   wherein the through-hole is produced by piercing the cellular material with a needle.

19. The method of claim 18,
   wherein the at least one fiber bundle is taken hold of by being hooked in the needle.

20. The method of claim 19,
   wherein the needle is essentially inserted into the through-hole in the cellular material such that the needle is followed by the at least one fiber bundle.

21. The method of claim 18,
   wherein the through-hole is produced with a cross-sectional surface smaller than double the thickness of the fiber bundle to be pulled therethrough such that the fiber bundle is compressed while being pulled through.

22. The method of claim 17, furthermore comprising the steps of:
   shearing off the at least one fiber bundle pulled into the through-hole such that the fiber bundle ends flush with at least one of the first and second surfaces; or
   placing the at least one fiber bundle pulled into the through-hole against at least one of the first and second surfaces.

23. The method of claim 17, furthermore comprising the step of:
   forming or arranging a cover layer on at least one of the first and second surfaces.

24. The method of claim 17, furthermore comprising the step of:
   filling the through-hole containing the at least one fiber bundle with a matrix system.

25. The method of claim 17,
   wherein the method begins anew after the at least one fiber bundle was pulled into the cross-sectional in the cellular material.

* * * * *